(No Model.)  7 Sheets—Sheet 3.

P. B. LOW.
APPARATUS FOR COALING SHIPS AT SEA.

No. 489,749. Patented Jan. 10, 1893.

Witnesses
Percy C. Bowen
John D. Wilson

Inventor
Philip B. Low
By Whitman & Wilkinson
Attorneys (No Model.) 7 Sheets—Sheet 4.

P. B. LOW.
APPARATUS FOR COALING SHIPS AT SEA.

No. 489,749. Patented Jan. 10, 1893.

Witnesses
Percy C. Bowen
John Q. Wilson

Inventor
Philip B. Low
by Whitman & Wilkinson
Attorneys (No Model.) 7 Sheets—Sheet 5.
P. B. LOW.
APPARATUS FOR COALING SHIPS AT SEA.
No. 489,749. Patented Jan. 10, 1893.

Witnesses
Percy C. Bowen
John C. Wilson

Inventor
Philip B. Low,
By Whitman & Wilkinson
Attorneys

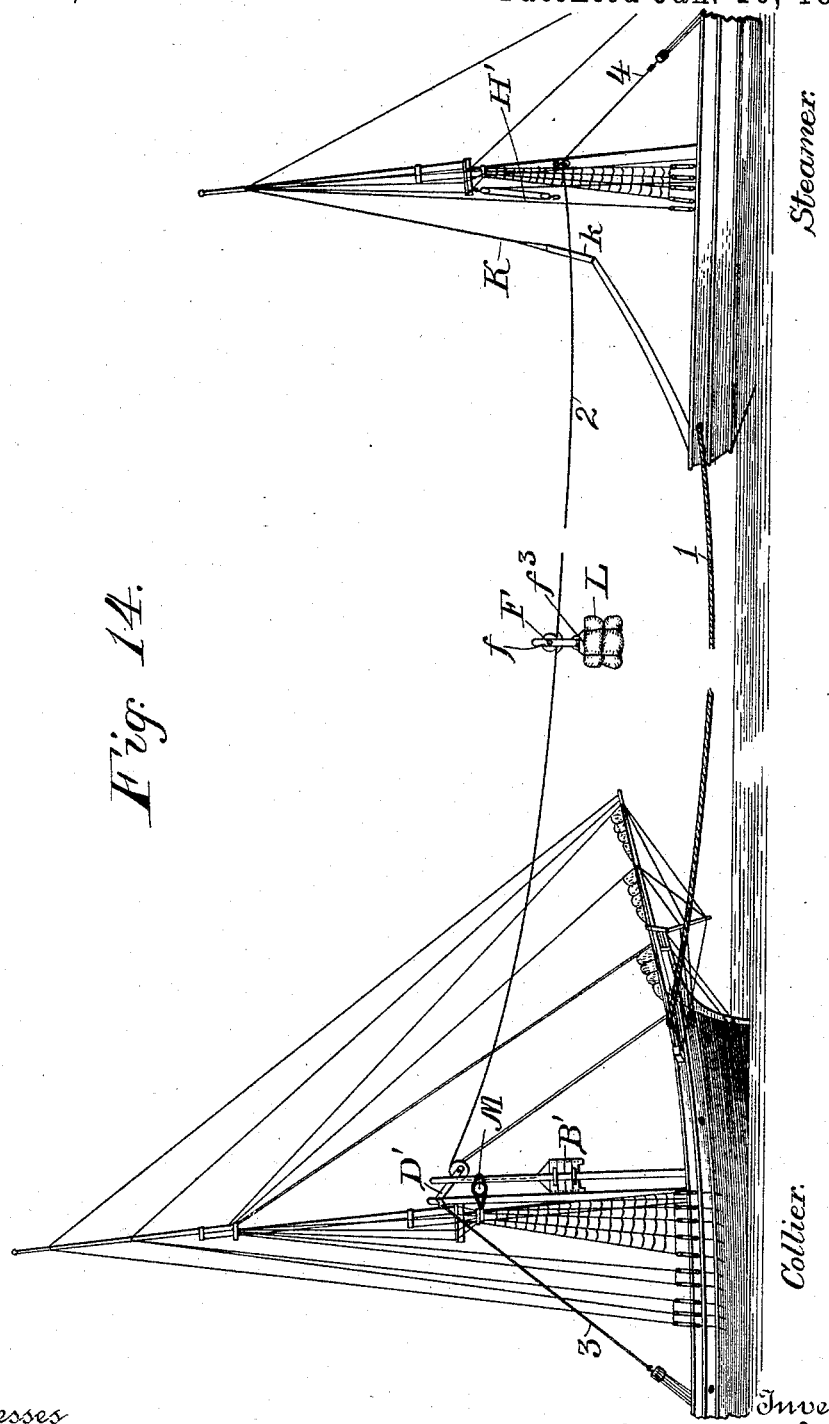

(No Model.)
P. B. LOW.
APPARATUS FOR COALING SHIPS AT SEA.
No. 489,749.  Patented Jan. 10, 1893.
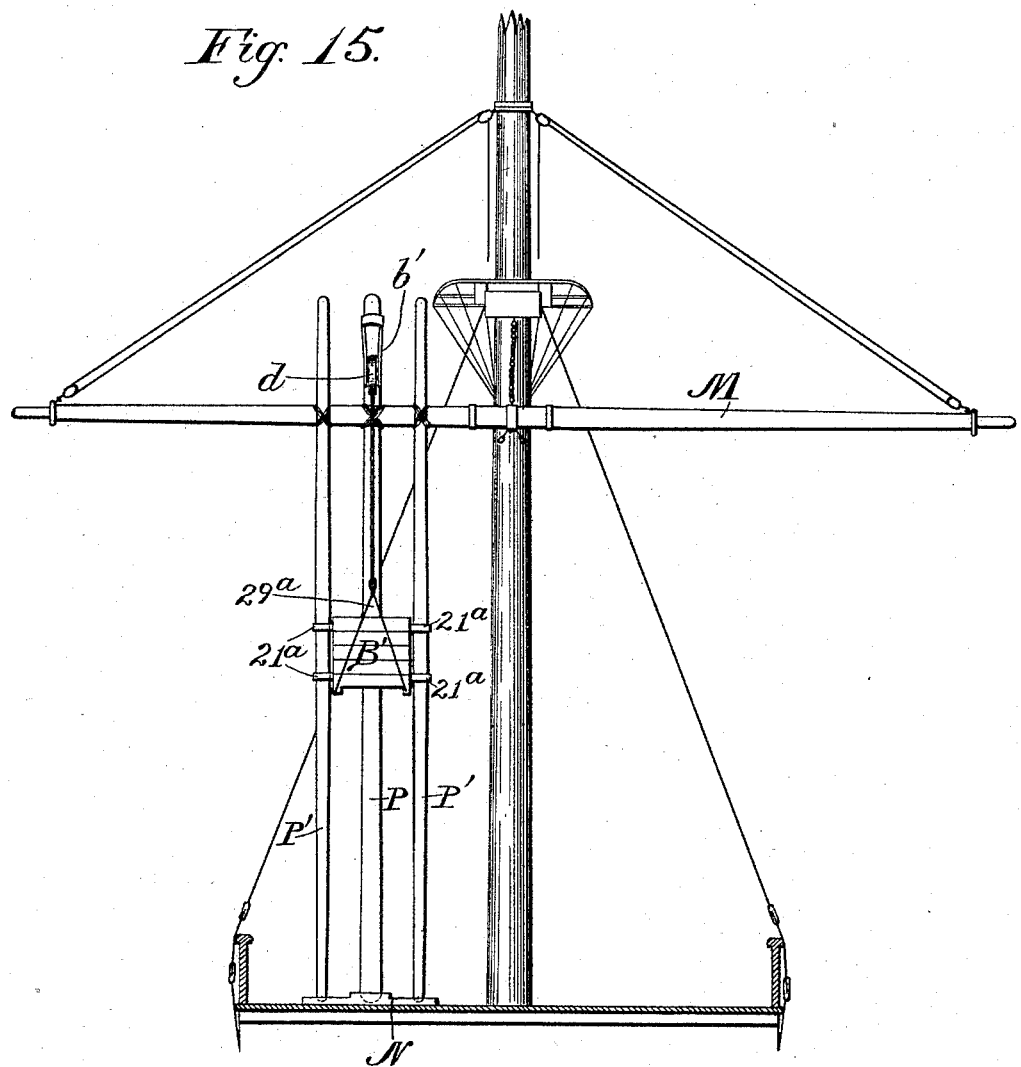
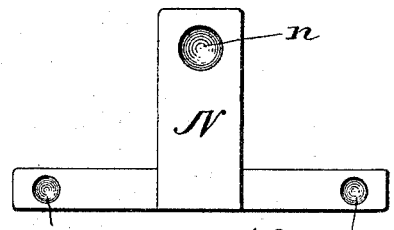

UNITED STATES PATENT OFFICE.

PHILIP B. LOW, OF NEW YORK, N. Y.

APPARATUS FOR COALING SHIPS AT SEA.

SPECIFICATION forming part of Letters Patent No. 489,749, dated January 10, 1893.

Application filed June 11, 1892. Serial No. 436,298. (No model.)

*To all whom it may concern:*

Be it known that I, PHILIP B. LOW, a citizen of the United States, residing at New York city, in the county of New York and State of New York, have invented certain new and useful Improvements in the Method of and Apparatus for Coaling Ships at Sea; and I do hereby declare the following to be a full, clear, and exact description of the invention, such as will enable others skilled in the art to which it appertains to make and use the same.

My invention relates to a method of and apparatus for, coaling ships, designed to be operated either in port, or at sea, but especially adapted for use at sea, or in open roadsteads, where it is impossible for the collier and the vessel to be coaled, to come along side of each other.

While primarily intended for the purpose of transferring coal from one vessel to another, my invention is equally applicable to transferring stores or other articles capable of being transported in not too heavy packages.

Reference is had to the accompanying drawings, wherein the same parts are indicated by the same letters and figures.

Figure 1:
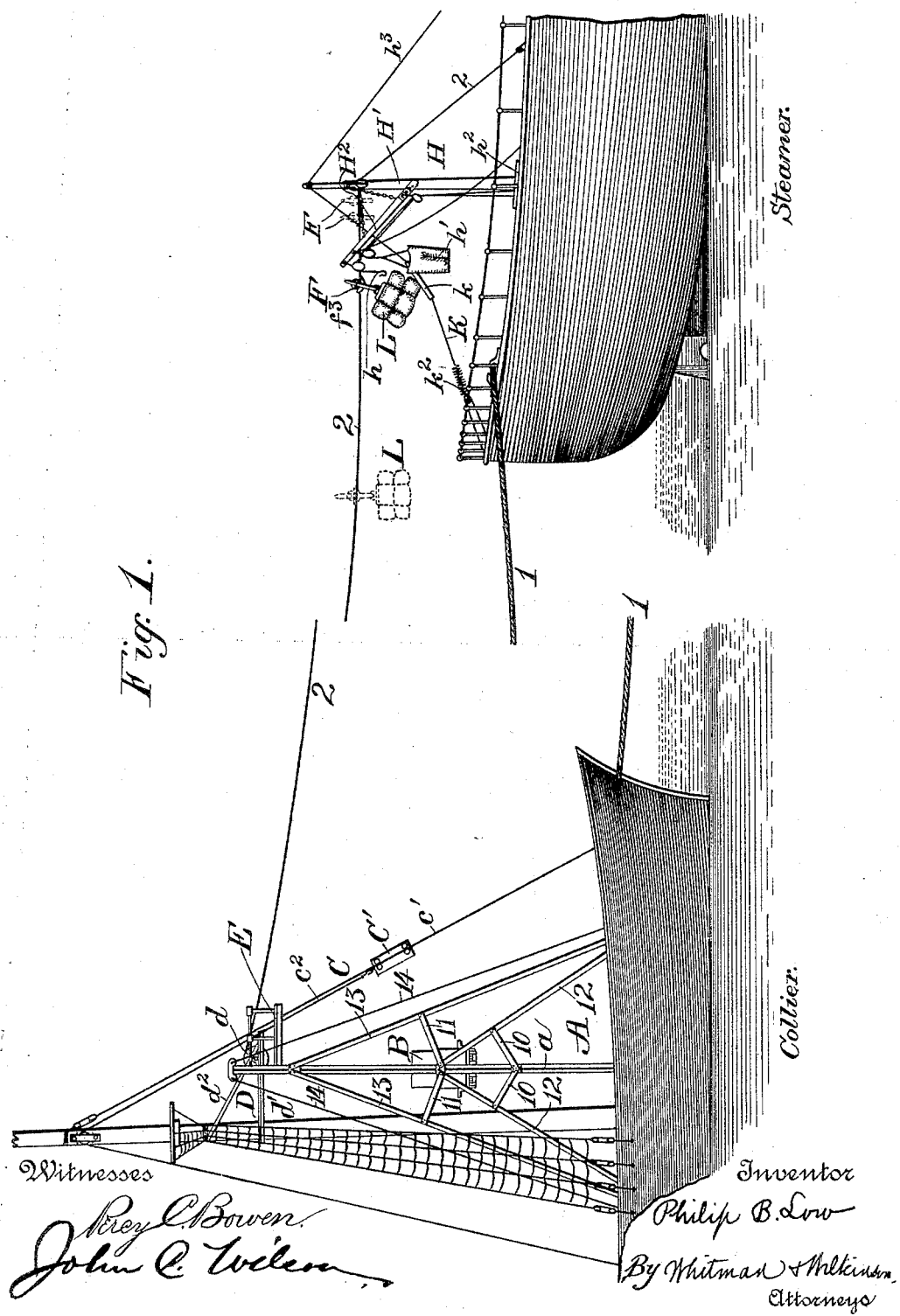
Figure 2:
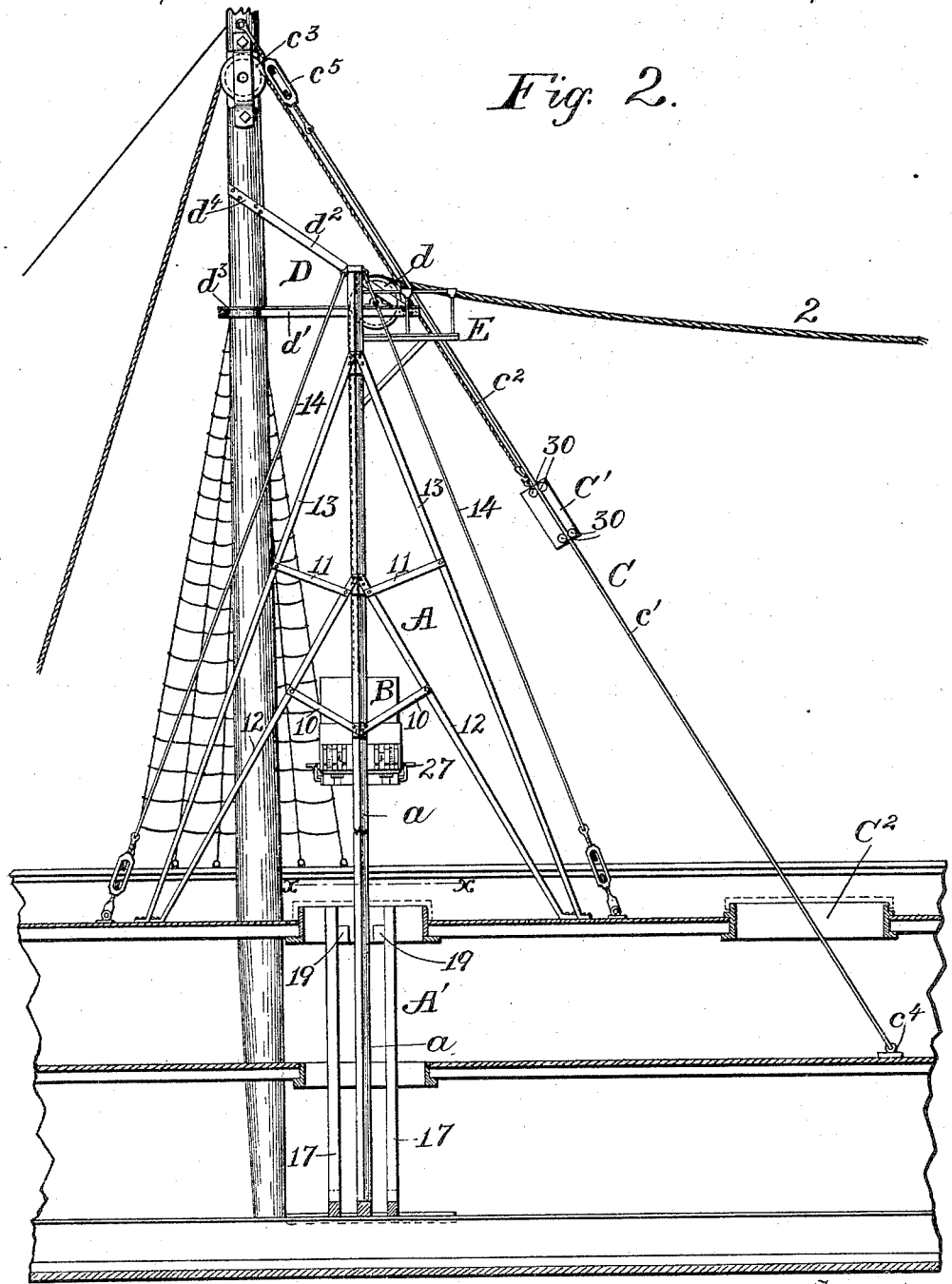
Figure 3:
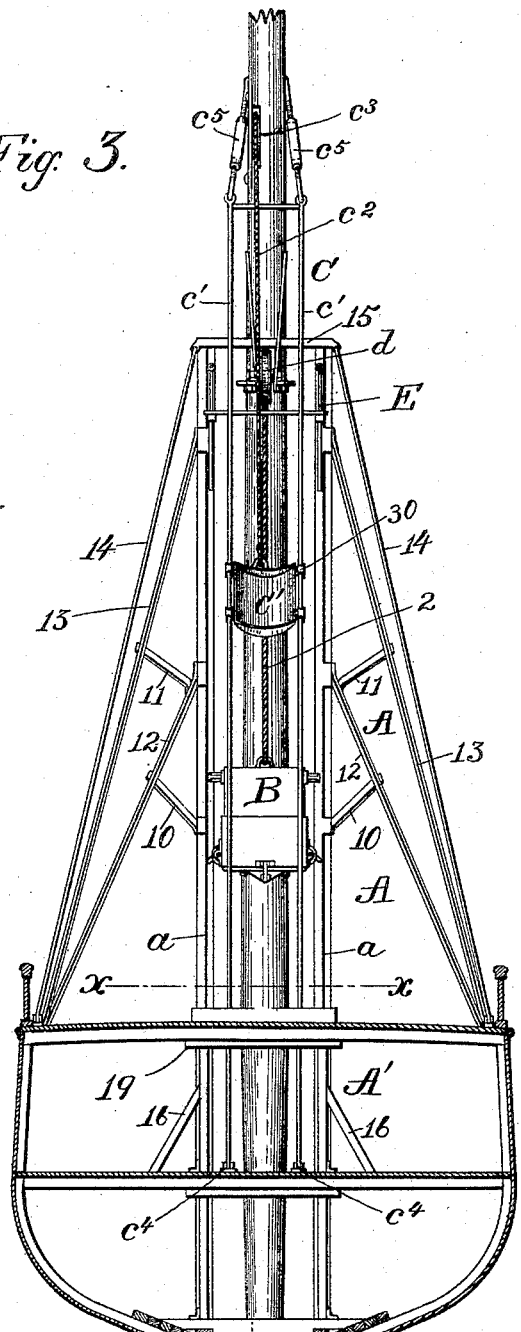
Figure 4:
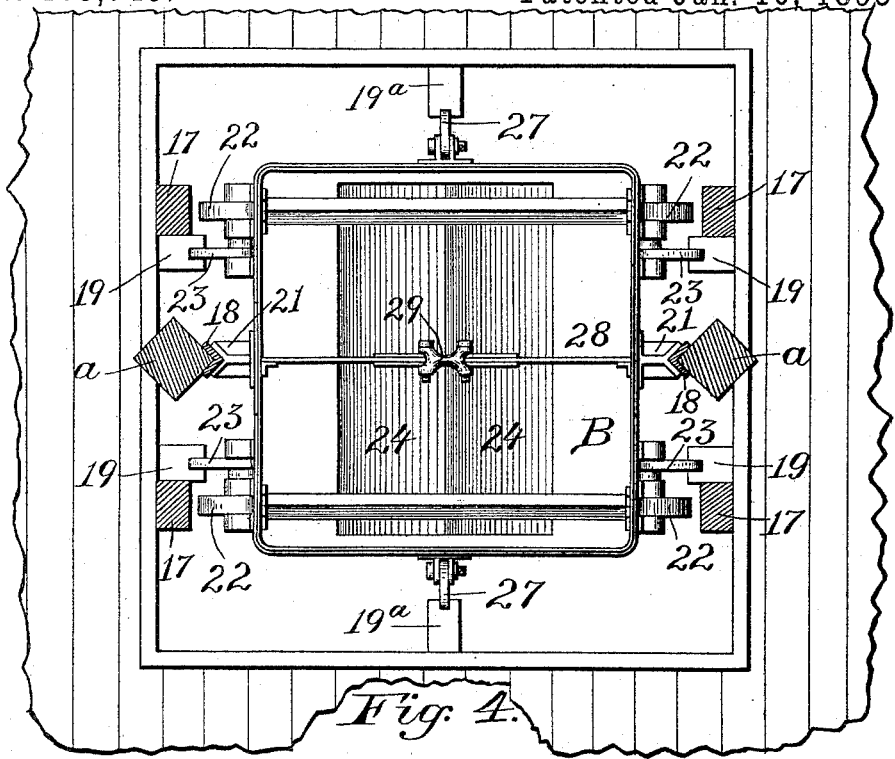
Figures 5, 6:
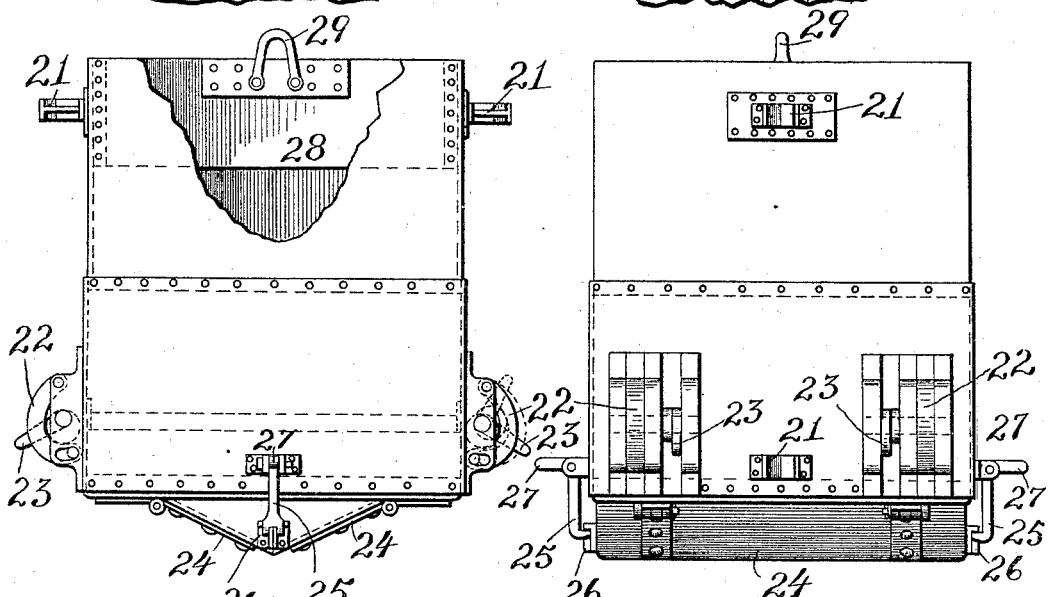
Figure 8:
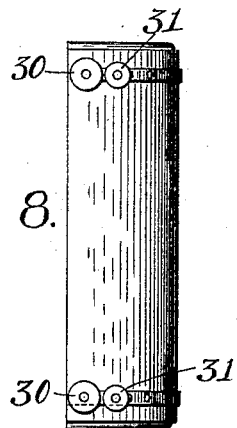
Figure 7:
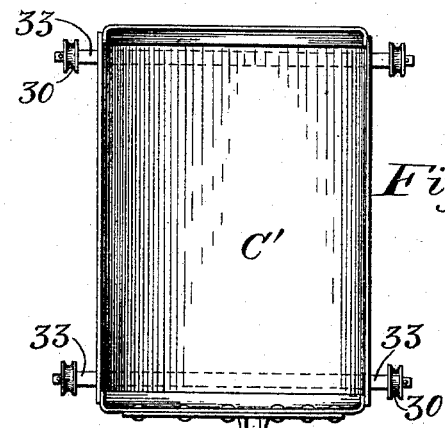
Figures 10, 11:
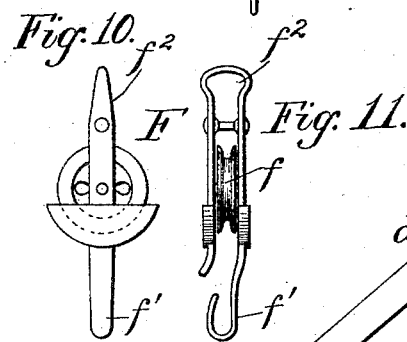
Figure 9:
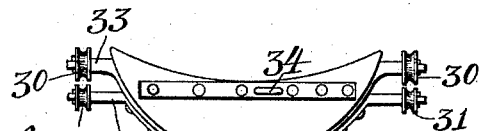
Figure 12:
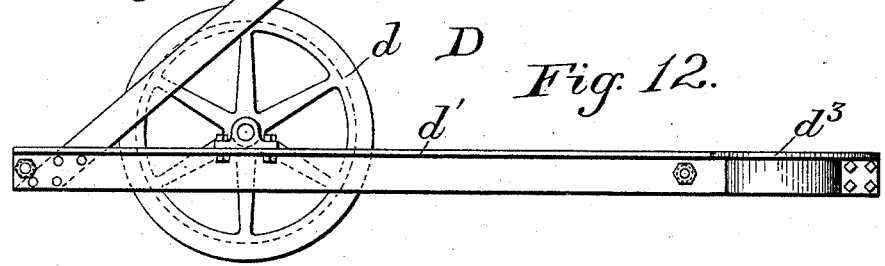
Figure 13:
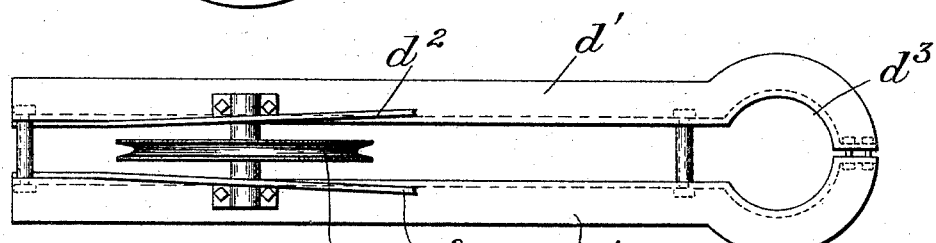

Figure 1 represents a side elevation of a steamer towing a collier, and receiving coal therefrom, parts being broken away. Fig. 2 represents a longitudinal vertical section of the portion of the collier just forward of the foremast, when the said colier is specially fitted for transporting coal according to my invention. Fig. 3 represents a transverse section of the collier from forward of the counterpoise well, looking aft. Fig. 4 represents a section of the counterpoise framework, along the line *x x* of Fig. 3, the counterpoise being shown as down in the well and empty. Fig. 5 represents a front or rear elevation of the counterpoise detached. Fig. 6 represents a side view of the counterpoise detached. Fig. 7 represents an interior view of one of the coal cars for use in carrying the bags up to the transmission wire. Fig. 8 represents a side view of one of said cars inverted. Fig. 9 represents a front view of one of said cars. Fig. 10 represents a side elevation, and Fig. 11 a front elevation of one of the travelers used for slinging the coal bags on the transmission wire, and for transmitting them across. Fig. 12 represents a view from the port side of the roller for the transmission wire, and illustrates the method of supporting the same on the mast. Fig. 13 represents a plan view of the device shown in Fig. 12. Fig. 14 represents a side elevation of a modification of the method of coaling ships, wherein the collier is not specially fitted for doing the same, and illustrates a method of applying the invention to any vessel carrying coal. Fig. 15 represents a front view of the counterpoise and guides shown in Fig. 14, and Fig. 16 represents a plan view of the shoe placed on the deck to support the weight of the counterpoise transmission wire and attachments.

The steamer requiring coal takes the collier in tow and steams head to sea, or in calm weather, in such direction as is most convenient, adjusting the tow-line or hawser 1, of which there may be one or more, until the vessels are sufficiently far apart to avoid collision; and far enough also to enable a steady strain to be kept on the hawser. The transmission wire 2 is a wire rope of sufficient strength secured aboard the steamer, and passing back aboard the collier runs over a sheave, and is attached to a counterpoise, which is free to move up and down between suitable guides. This counterpoise hanging from the end of the transmission wire keeps a steady strain on the wire irrespective of the pitching or rolling of either or both the vessels. If in port, the two vessels may be brought sufficiently near together, and at any line of bearing, and a tow-line run out the required distance; this line should be hove taut, and the transmission wire set up as before.

To enter more particularly into the details of construction—A represents a framework supporting guide posts *a* for the sides of the counterpoise B. This framework A is immediately over a well A' preferably extending through the decks to the keelson, called the counterpoise well, into which the guide posts *a* extend.

10, 11, 12, 13 and 14, are braces forming part of this framework, and steadying the guide posts *a*. 15 is a cross piece secured across the upper end of the said guide posts. 16 are braces between the said posts and the lower deck.

The counterpoise B is a rectangular box of sufficient size attached to the end of the transmission wire, and intended to travel up and down so as to keep a uniform strain on the said transmission wire, irrespective of the pitching or rolling of either or both vessels. This counterpoise consists of a rectangular box of sufficient size, preferably made out of sheets of boiler iron, and filled with coal, sand, or any other suitable material. In order to prevent this box from swaying violently from side to side as the collier pitches and rolls, four guide pieces 21, two on a side, are attached to the box, these guide pieces have angular jaws which slide freely up and down between the guide posts $a$. If these guide posts are made of wood, an angular plate 18 should be attached to the edge of the said posts to take up the wear of the guide pieces 21, as shown in Fig. 4. In order to prevent the counterpoise from descending too violently down the counterpoise well, posts 17, and pieces 19 are provided in the counterpoise well in the wake of the eccentrics 22, and levers 23 attached to the counterpoise. These levers 23 are on the same shaft with the eccentrics 22, and striking the pieces 19 as the counterpoise descends, they are knocked upward, throwing the eccentric outward, as shown in dotted lines in Fig. 5. The eccentric catches in the wood post 17, and acts as a brake on the downward motion of the counterpoise. It will be seen that the upward motion will relieve the eccentrics, while a continuation of the downward motion, will press them harder against the wooden posts 17. The surface of these eccentrics may be roughened or serrated if desired. As a further preventive of too rapid descent into the well, the bottom of the counterpoise is closed by two doors 24, hinged near the sides of the counterpoise, and inclined to each other at an angle, as shown in Fig. 5. These doors are each provided with a catch 26 in which the devil's claw or hook 25, engages, and so the door is kept closed. This devil's claw is pivoted to the side of the box, and has its upper end terminating in a bent lever 27, which is adapted to strike on the stud $19^a$ in the counterpoise well, and allow the contents of the counterpoise to drop out. This automatic opening of the doors is also convenient when it is desired to discontinue coaling, and the strain on the hawser is relieved by the slowing down of the forward ship, the empty box then descending into the counterpoise well, and its late contents being readily removed.

28 is a stiffening plate to which the eye 29 for locking on the transmission wire is secured.

The coal elevator C consists of a car C' raised or lowered along the wire ropes $c'$, by the halyards $c^2$. These cars are fitted with supporting wheels 30, and guide wheels 31 between the flanges of which the wire ropes $c'$ are held. The axles 32 and 33 are riveted to the body of the car, which is preferably of sheet iron.

34 is a hook for the halyards.

The roller $d$ for the transmission wire is mounted on a framework D which consists of two iron beams $d'$ encircling the mast and bolted together, and two supports $d^2$ inclined upward and secured to the mast at the desired height.

B represents a platform for the coal passers to secure the bags to the travelers F. These travelers consist of a central sheave $f$, and open hook $f'$ to engage the slings of the bags, and an eye $f^2$ for the transporting tackle on the steamer; but the said transporting tackle may be hooked directly in the slings of the bags L as shown to the right in Fig. 1.

The apparatus on the steamer consists of a device K for checking the speed of the bags, although the upward slope of the catenary formed by the transmission wire, will ordinarily be sufficient for this purpose; and a device for lowering the bags from the transmission wire to the deck. In Fig. 1 a derrick H is placed near the stern of the ship. This derrick may be mounted on a shoe $h^2$, and the mast H' may be stayed by stays $h^3$ in the usual way. The wire rope 2 runs through a heavy snatch block on the derrick mast H', and is then secured on deck as shown. The arm $H^2$ of the derrick is provided with a hook and whip $h$ adapted to engage the slings of the bags L, and a platform may be arranged beneath, or a man may be slung in preventer breeches $h'$ beneath the derrick to hook on the whip $h$, and to pass the travelers F to the right out of the way as shown. The checking device K leads from the top of the derrick head, has a net $k$ to catch the bags, and may be provided with a spring $k^2$ to act as a buffer should the velocity of the bags be high, as would happen sometimes, for instance when the stern of the steamer is in the trough of the sea, and the bow of the collier is on the crest of a wave. The bags are preferably transported in packages of two or more.

In the devices shown in Figs. 14, 15, and 16, stout poles P and P', studding sail booms will be suitable, are secured on either side of the foreyard on the quarter, and the box B' filled with chain, or other material and provided with guides $21^a$ is arranged to move up and down between these uprights. The said uprights are mounted on a shoe N and having steps $n$ while the transmission wire passes over a roller secured by a strap D' to the upper end of the upright P, which is supported by the back stay 3 set up on deck.

The apparatus on the steamer consists of the burton and the checking device K. A platform for unhooking the bags may also be employed, or a man may be sent up in the rigging for the purpose. The transmission wire 2 passes through a snatch block on the mast head and is set up on deck as before.

When it is desired to send back the travelers, with or without the empty bags, a hauling line is passed through a suitable leading block and is attached to one of the weighted packages, the package is then allowed to go across; the hauling line is then used to haul all the empty travelers and the empty bags also, if desired, back on board the collier.

Wheeled carriages of suitable construction may be used as well as the single wheel travelers.

The height of the rear end of the transmission wire above the front or delivery end of the same should be regulated by the distance between the vessels, the weight of the counterpoise, and the load to be put on the transmission wire. About one foot slope to every eight feet between the vessels would be sufficient under average conditions.

It will be evident that stores of every description, as well as coal, may be transported in the same way. It will also be evident that it is immaterial which vessel be ahead and towing, so long as the end of the transmission wire is higher on the vessel delivering coal, stores, &c., than it is on the vessel receiving the said coal and stores; and it may frequently be more convenient to have the collier take the other vessel in tow; which can be done by a simple rearrangement of parts.

Having thus described my invention, what I claim, and desire to secure by Letters-Patent of the United States, is:—

1. An apparatus for transporting packages from one moving vessel to another, comprising a tow line between the two vessels, a transmission wire secured to one vessel and running over an elevated roller on the other vessel, a counterpoise connected to the free end of said wire and suspended thereby, and wheeled vehicles mounted on the said wire, substantially as and for the puposes described.

2. An apparatus for transporting packages from one moving vessel to another, comprising a tow line between the two vessels, a transportation wire secured to one vessel and running over an elevated roller on the other vessel, a counterpoise connected to the free end of the said wire, and suspended thereby, guides for the said counterpoise, and wheeled vehicles mounted on the said wire, substantially as described.

3. An apparatus for transporting coal from one moving vessel to another, comprising a tow line between the two vessels, a transmission wire secured to the forward vessel, and running over an elevated roller on the other vessel, a counterpoise with suitable guides therefor, suspended at the free end of said transmission wire, wheeled vehicles passing over said wire, and means for bringing the coal in bags to said vehicles and securing said bags on said vehicles, substantially as described.

4. An apparatus for transporting coal from one moving vessel to another, consisting essentially of a tow line between the two vessels, a wire rope secured at one end to one vessel and passing over an elevated roller on the other vessel; a counterpoise suspended from the free end beneath said roller; guides for said counterpoise; wheeled vehicles mounted on said wire, means of attaching or supporting said packages on said wheeled vehicles, and means for hoisting said coal up to the said wheeled vehicles, and for lowering said coal from the delivery end of said transmission wire, substantially as and for the purposes described.

5. An apparatus for transporting coal from one vessel to another at sea, consisting essentially of a wire rope secured at one end to one vessel and passing over an elevated roller on the other vessel; a counterpoise suspended from the free end beneath said roller; guides for the said counterpoise; wheeled vehicles mounted on said wire, and means of attaching or supporting said packages on said wheeled vehicles; and means for hoisting said coal up to the said wheeled vehicles, and for lowering said coal from the delivery end of said transmission wire, substantially as and for the purposes described.

6. An apparatus of the character described, comprising a transmission wire secured to one vessel and passing over an elevated roller on the other vessel; wheeled vehicles adapted to run on said transmission wire; a counterpoise suspended at the free end of said transmission wire guide pieces on said counterpoise, vertical guide posts engaging said guide pieces; friction posts at either side of said counterpoise; trip pieces near said friction posts; eccentrics attached to the sides of said counterpoise; and levers rigidly attached to the shafts of said eccentrics and adapted to strike said trip pieces, whereby the said eccentrics are thrown out against said friction posts, substantially as and for the purposes described.

7. An apparatus of the character described, comprising a transmission wire secured to one vessel and passing over an elevated roller on the other vessel; wheeled vehicles adapted to run on said transmission wire; a counterpoise suspended at the free end of said transmission wire; guides for the counterpoise, and hinged doors in the bottom of the said counterpoise opening downward with catches on the said doors and devils' claws or hooks pivoted to the side of the counterpoise engaging said catches and terminating in a lever arm, and trip pieces placed in the wake of said levers whereby the said levers may be tripped and the contents of the counterpoise automatically discharged when it has descended to a certain position, substantially as and for the purposes described.

In testimony whereof I affix my signature in presence of two witnesses.

PHILIP B. LOW.

Witnesses:
GEORGE EDWARD KENT,
JAMES A. LYNCH.